United States Patent
Bonnefous et al.

(10) Patent No.: US 10,494,120 B2
(45) Date of Patent: Dec. 3, 2019

(54) OPTICAL LIGHTING SYSTEM FOR AN AIRCRAFT

(71) Applicant: ZODIAC AERO ELECTRIC, Montreuil (FR)

(72) Inventors: Edouard Bonnefous, Saint-Mande (FR); Frédéric Dratz, Paris (FR); Christian Tsao, Rosny sous Bois (FR)

(73) Assignee: Zodiac Aero Electric, Montreuil (FR)

( * ) Notice: Subject to any disclaimer, the term of this patent is extended or adjusted under 35 U.S.C. 154(b) by 189 days.

(21) Appl. No.: 14/541,596

(22) Filed: Nov. 14, 2014

(65) Prior Publication Data

US 2015/0146442 A1    May 28, 2015

(30) Foreign Application Priority Data

Nov. 15, 2013  (FR) ..................................... 13 61178

(51) Int. Cl.
   *B64D 47/04*   (2006.01)
   *F21S 41/657*  (2018.01)
   *B64D 47/02*   (2006.01)

(52) U.S. Cl.
   CPC ............. *B64D 47/04* (2013.01); *B64D 47/02* (2013.01); *F21S 41/657* (2018.01)

(58) Field of Classification Search
   CPC ..... B64D 47/04; B64D 47/02; F21S 48/1742; F21S 41/657
   See application file for complete search history.

(56) References Cited

U.S. PATENT DOCUMENTS

| | | | | |
|---|---|---|---|---|
| 3,742,502 A | * | 6/1973 | Brady | ........................ G01S 1/02 342/401 |
| 5,355,131 A | | 10/1994 | Metz et al. | |
| 5,959,826 A | * | 9/1999 | Baurand | ................. H01H 89/06 361/115 |
| 8,801,240 B2 | * | 8/2014 | Edupalli | .............. B60Q 1/0433 362/460 |
| 2004/0232864 A1 | * | 11/2004 | Sunaga | ..................... H02P 7/29 318/434 |
| 2008/0137353 A1 | | 6/2008 | Larsen et al. | |
| 2012/0069589 A1 | * | 3/2012 | Willeke | ................. B64D 47/04 362/470 |
| 2012/0303223 A1 | * | 11/2012 | Kasaba | ..................... B60Q 1/10 701/49 |
| 2013/0122928 A1 | * | 5/2013 | Pfluger | ................... G01P 13/00 455/456.1 |
| 2013/0226376 A1 | * | 8/2013 | Shamasundar | ...... G08G 5/0021 701/14 |

FOREIGN PATENT DOCUMENTS

| | | |
|---|---|---|
| DE | 10159134 | 6/2003 |
| EP | 2514673 | 10/2012 |
| GB | 547412 | 8/1942 |

OTHER PUBLICATIONS

Search Report for FR Patent Application No. FR 1361178 dated Jun. 30, 2014.

* cited by examiner

*Primary Examiner* — Sharon E Payne

(74) *Attorney, Agent, or Firm* — Meyertons, Hood, Kivlin, Kowert & Goetzel, P.C.; Mark R. DeLuca

(57) ABSTRACT

An optical lighting system for an aircraft includes an optical unit that can be configured according to the phases of flight or taxiing of the aircraft in order to emit a beam of light the spread and aim characteristics of which are dependent on the said phases of flight or of taxiing.

12 Claims, 11 Drawing Sheets

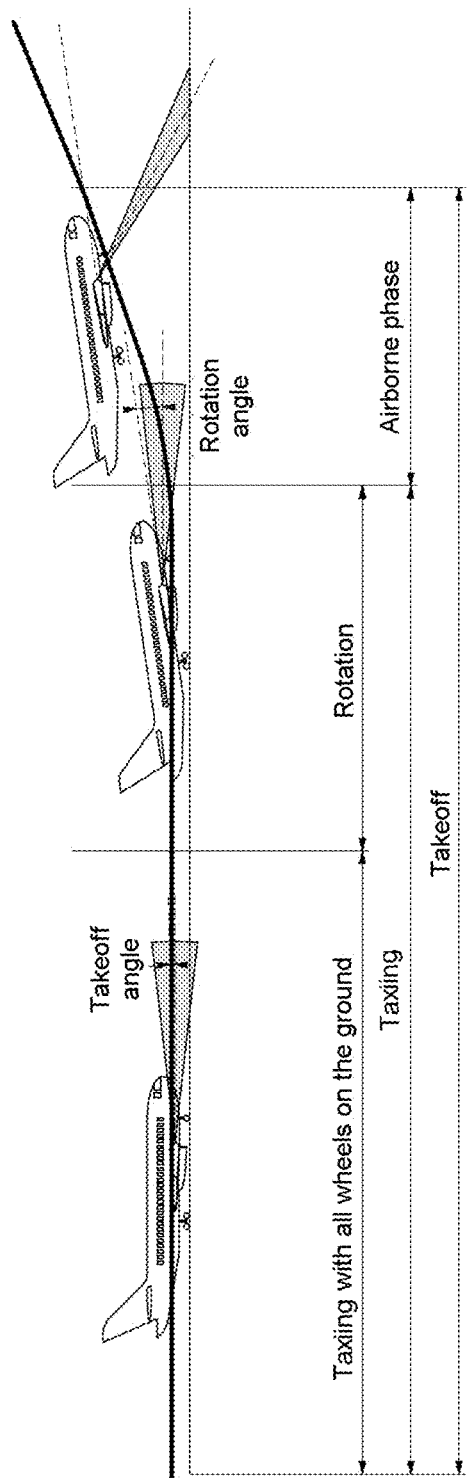

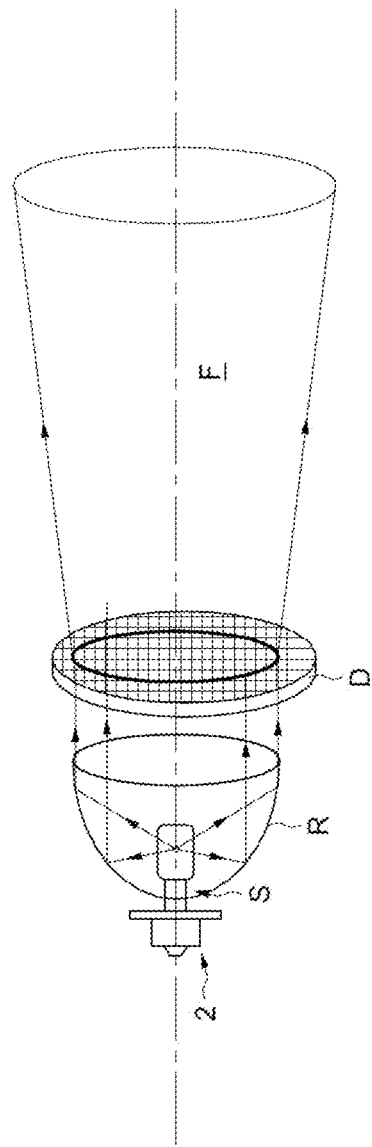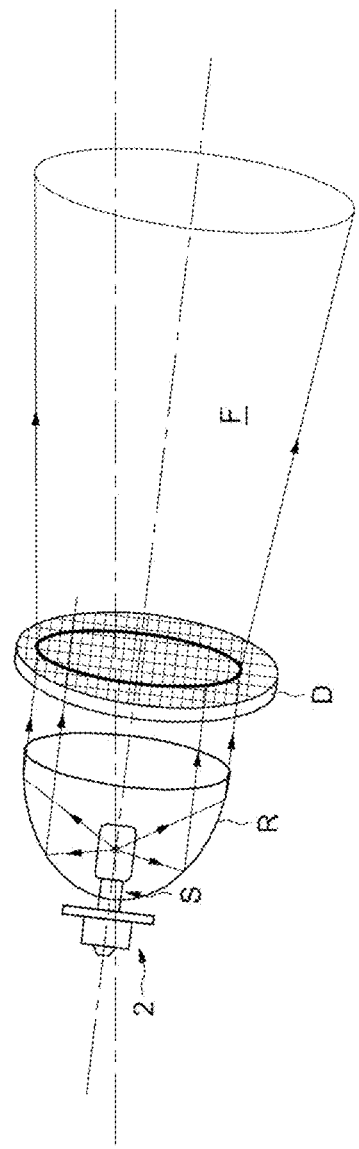

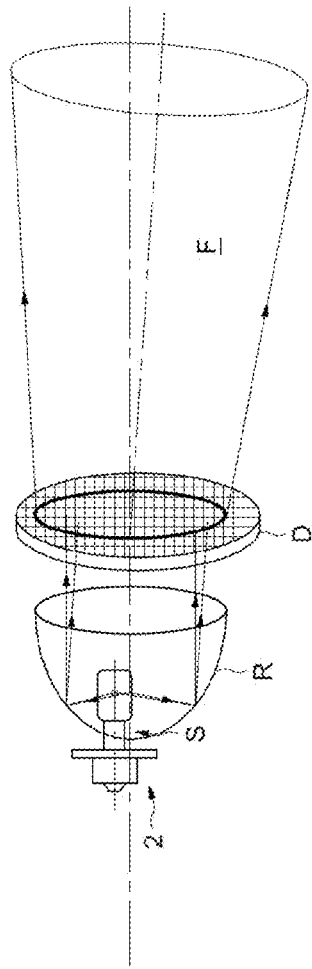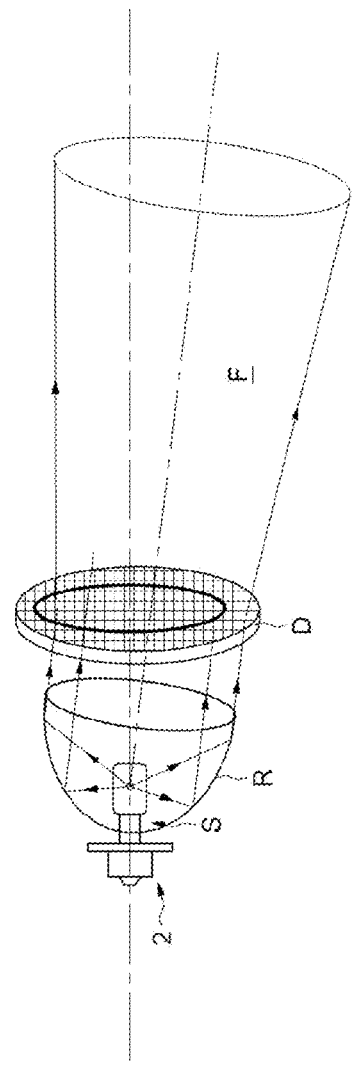

OPTICAL LIGHTING SYSTEM FOR AN AIRCRAFT

PRIORITY CLAIM

This application claims priority to French Patent Application Serial No. FR 1361178 filed Nov. 15, 2013, which is incorporated herein by reference in its entirety.

BACKGROUND OF THE INVENTION

1. Field of the Invention

The present invention relates to an on-board lighting system for an aircraft and relates more particularly to a servocontrolled optical lighting system for an aircraft, which is capable of performing at least some of the lighting functions, notably a combination of these functions, during the various phases of landing, taxiing and take off of the aircraft by night.

2. Description of the Relevant Art

In the prior art, runway lighting systems onboard aircraft consist of a set of several lighting devices which are activated according to the phases of flight or taxiing of the aircraft. The lighting system in its entirety is thus capable of offering a taxiing function, generally referred to by its English name of "Taxi Light", a turn off function, generally known by its English name of "Runway TurnOff Light", a takeoff function ("TakeOff Light"), and a landing function ("Landing Light").

These functions are performed by a set of separate lights fixed to the landing gear strut and in the leading edge of the wings, at the wing root or under the wing in the case of certain retractable lights.

By night, during the phases of landing, taking off, taxiing along the runway or along the taxiway, these various lighting systems are used in succession or simultaneously in order to allow the pilot to identify the space in which he needs to move around by night.

The distinct lights involved in the makeup of the lighting system are capable of emitting beams of light the intensity distribution and aim of which are tailored to the requirement in terms of pilot visibility.

In the context of lighting systems onboard airplanes, during the approach phase, the landing lights are aimed along the rectilinear glide slope of the airplane. During this phase, the zone that is to be illuminated corresponds to the point on the runway at which the airplane is to touch down. This is because this is the spot that the pilot needs to look at.

During the landing, and more particularly during the touch down phase (the English expression "touch down" is widely used) and more precisely before the wheels of the main landing gear touch the runway, the attitude of the airplane varies. The path followed by the airplane rounds off to become tangential to the runway.

Soon after this touch down phase, the front landing gear comes into contact with the ground. It is then the takeoff lights that take over, their aim being substantially parallel to the ground. These lights illuminate the ground as far ahead of the airplane as possible. During this phase, the zone that needs to be illuminated corresponds to the end of the runway.

During the approach and landing phases, the beam of light delivered by the lighting system has a spatial distribution and light intensity that remains the same. This spatial distribution is collimated in the direction of aim.

During the taxiing phase, it is the taxi lights and runway turn off lights that are used on the taxiways in order to leave or join the runway. During these phases, the lighting is characterized by a light distribution that is widely spread in the horizontal direction in order to identify an obstacle in the immediate surroundings of the aircraft, mainly in front of the cockpit and in front of the wings. This beam is concentrated in the vertical direction and angled down towards the ground in order to minimize the risks of dazzling runway personnel that encounter the beam.

The lighting systems according to the prior art, carried onboard aircraft, have a certain number of notable disadvantages.

First, the lights used are fixed. Their orientation can therefore never follow the angular variations in the incidence of the aircraft during the landing and takeoff phases, notably during variations in the direction or strength of the prevailing winds. The attitude of the aircraft may, in this respect, vary significantly when the direction or strength of the prevailing wind varies, although it is necessary to obtain good precision in the aim of the beam of light. The lighting thus achieved on the runway may vary greatly and lack effectiveness.

Second, as indicated hereinabove, the set of equipment that performs the various lighting functions described hereinabove is generally made up of distinct optical units, thereby contributing to increasing the overall mass of the lighting systems carried onboard an aircraft. Now, as is known, in the field of aeronautics, mass is a critical parameter.

Moreover, the electrical consumption, the size and the number of locations needed to perform lighting that is satisfactory with respect to the demanded performance, impose notable constraints on installation and supply of electrical power.

Finally, simultaneously switching on the landing and takeoff beams may impair the visual perception of the pilots by reducing the contrast in the zones being observed.

SUMMARY OF THE INVENTION

Embodiments described herein are directed to a lighting system for an aircraft that is able to lessen the disadvantages associated with the use of the conventional lighting systems and, notably, to propose a hybrid light capable of performing at least some of the lighting functions, notably a combination of several lighting functions needed during the various phases of flight or taxiing of an aircraft.

In one embodiment, an optical lighting system for an aircraft includes an optical unit that can be configured according to the phases of flight or taxiing of the aircraft in order to emit a beam of light the characteristics of which are dependent on the said phases of flight or of taxiing.

It is notably a matter of proposing a servocontrolled lighting system capable of supplying lighting the characteristics of which are modified according to the phases of flight or of taxiing.

In other words, a lighting system is described that is capable not only of reducing the number of equipment items needed for implementing all of the lighting functions but also capable of optimizing the visibility of the zones illuminated.

Thus, by virtue of the use of a configurable optical unit, it is possible to use a single item of equipment the direction of aim and the spatial distribution of the intensities of which can vary as a function of the various phases of flight or of taxiing mentioned hereinabove.

Indeed it will be noted that the configurable characteristics of the beam of light emitted by the optical unit notably consist of the shape of the beam of light and/or the orientation thereof.

According to another embodiment, the optical lighting system includes a detection device capable of detecting the phases of flight or of taxiing of the aircraft and a modification device capable of modifying the characteristics of the beam of light emitted as a function of the phases detected.

The detection device is capable of measuring the attitude of the aircraft.

The detection device may include at least one sensor of the accelerometer type and preferably an accelerometer and a gyrometer, which is associated with a data filter.

According to another embodiment, the detection device includes an inclination sensor capable of measuring the inclination of the beam of light with respect to an axis of the aircraft.

For example, the detection means use information regarding contact of the aircraft landing gear with the ground.

In one embodiment, the optical system includes a fixed support for mounting the optical system on the aircraft and a mobile support that can be moved with respect to the fixed support and on which a configurable element of the optical unit is fixed, and a controller configured to control the movement of the mobile support as a function of the phases of flight or of taxiing of the aircraft.

In one embodiment, the optical unit assembly is mounted on the mobile support so that it can be oriented according to the phases of flight or of taxiing. In other words, it is a matter of orienting the optical unit assembly in order to modify the direction in which the beam of light is aimed.

In another embodiment, the optical unit includes a mobile reflector mounted on the mobile support.

The source may also be mounted on the mobile support.

According to yet another embodiment, the optical unit includes an optical device placed in the path of the beam of light emitted by the light source, the said device constituting a light beam deflecting device and being mounted on the mobile support.

According to yet another embodiment, the light source includes a set of light-emitting diodes that can be actuated selectively according to the phases of flight or of taxiing of the aircraft.

In various embodiments, the controller configured to control the movement of the mobile support includes a reduction motor actuator or a bistable electromagnet.

BRIEF DESCRIPTION OF THE DRAWINGS

Other objects, features and advantages of the invention will become apparent from reading the following description, given solely by way of nonlimiting example and made with reference to the attached drawings in which:

FIGS. 1-4 are diagrams illustrating the main phases of flight or of taxiing of an aircraft, and notably explaining the variations in the aim and distribution of intensity of a beam of light emitted by an aircraft optical lighting system;

FIGS. 8-14 show various embodiments of the controller configured to control the movement of the mobile support on which a configurable element of the optical unit is mounted.

Figure 1:
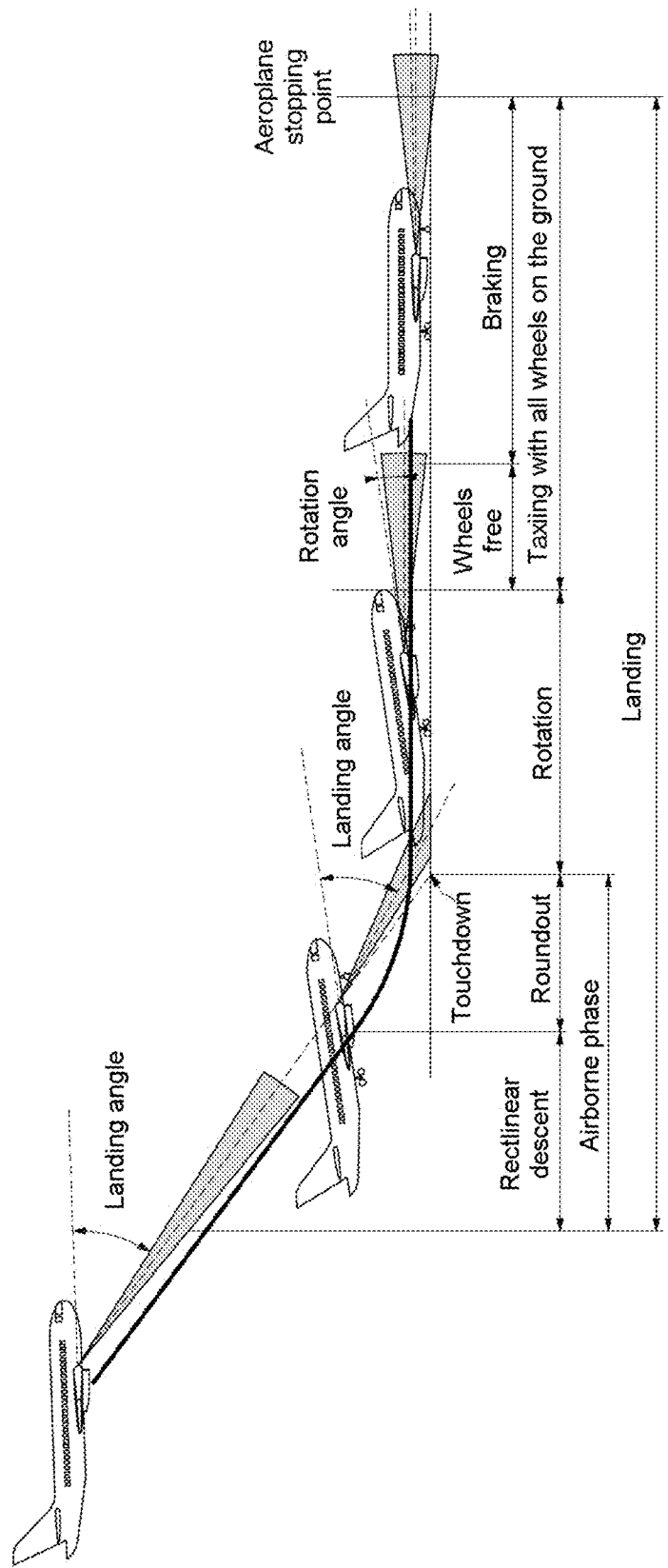

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Reference will be made first of all to FIGS. 1 to 4 which illustrate various phases of flight and of taxiing of an airplane and which notably show the angle of aim of the beam of light emitted by the airplane optical lighting system.

As may be seen in FIG. 1, and as indicated hereinabove, during the approach phase, prior to landing, the axis of the beam is aimed along the glide slope of the descending airplane, and in such a way as to take account of the various angles of attack of the airplane.

Throughout this phase, and notably during the phase referred to as the airborne phase, and more particularly during the rectilinear descent phase, the zone of the runway that is to be illuminated corresponds to the touchdown zone. During the approach phase, the angle of attack of the aircraft is around 3° with respect to the absolute horizontal. In consequence, the angle that the lighting beam of light emitted by the lighting system makes is determined on the basis of the landing angle and of the angle of attack of the airplane. The light is generally aimed at an angle of 6 to 10° with respect to the axis of the airplane.

As can be seen from this figure, during the touchdown phase just before the wheels of the main landing gear touch the runway, the path of the airplane rounds out to become substantially tangential to the ground. This phase is generally known by the name of round out. During this phase, the lighting still needs to be aimed towards the zone at which the airplane will touch down onto the ground so that the angle that the beam of light forms with respect to the overall axis of the airplane needs to be servocontrolled and modified, i.e. increased, so that the lighting system always points towards the touchdown zone.

Thereafter, when the main landing gear touches the ground, during the taxiing phase, the lighting system begins to correct its aim so that ultimately the lighting points towards the end of the runway, a long distance ahead of the airplane. In other words, during this taxiing phase and up to the end of the braking phase, the lighting system points horizontally, parallel to the overall axis of the airplane.

In consequence, from the rotation phase onwards, i.e. from the moment that the main landing gear of the airplane comes into contact with the runway, until the forward gear strut comes into contact with the ground, the lighting system angles the beam upwards as far as an angle close to the horizontal so that it is aimed further ahead of the cockpit. Throughout the landing phase, the lighting system therefore illuminates the runway continuously.

When the front landing gear comes into contact with the ground, the aim is practically parallel to the ground. More specifically, it is offset by around 0.5° downwards with respect to the ground.

With reference to FIG. 2, during the take-off phase and, more specifically, when all of the wheels of the airplane are in contact with the ground ("phase of taxiing with all the wheels on the ground"), the lighting system points further ahead towards the front of the airplane so that the beam of light is substantially parallel to the ground. As soon as the front landing gear leaves the ground (rotation phase), the lighting system modifies its aim by uniformly angling the beam downwards so as to take account of the incidence of the axis of the airplane in order constantly to illuminate the runway. In other words, during its take off phase, up to the airborne phase, the angle formed by the lighting system with respect to the overall axis of the airplane increases evenly.

Figure 4:
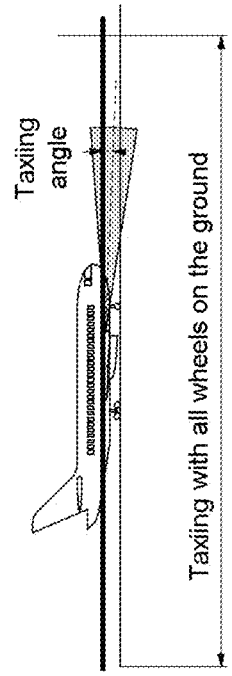
Figure 3:
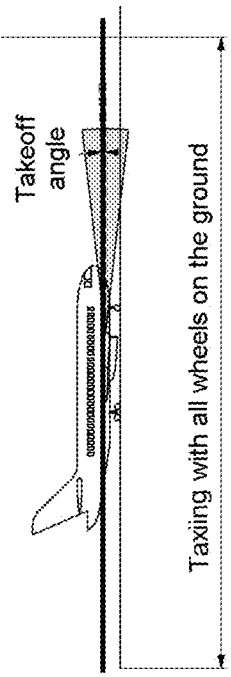

Furthermore, with reference to FIGS. 3 and 4, at the end of landing (FIG. 3), and then during taxiing along the taxiways, i.e. when the airplane leaves the runway (FIG. 4), the lighting needs to be angled downwards so as to minimize as far as possible any light above the horizon, so as to avoid the risk of dazzling.

Horizontally, the distribution of light is modified in such a way as to illuminate the immediate surroundings of the airplane in front of the cockpit and the wings, and approximately one hundred metres beyond.

During this phase, the beam of light is characterized by a wide horizontal spread so as to identify obstacles on the ground in front of the cockpit or in front of the wings.

A reverse adaptation of the beam of light is also necessary when the airplane leaves the taxiways to join the runway, prior to take off.

Figure 5:
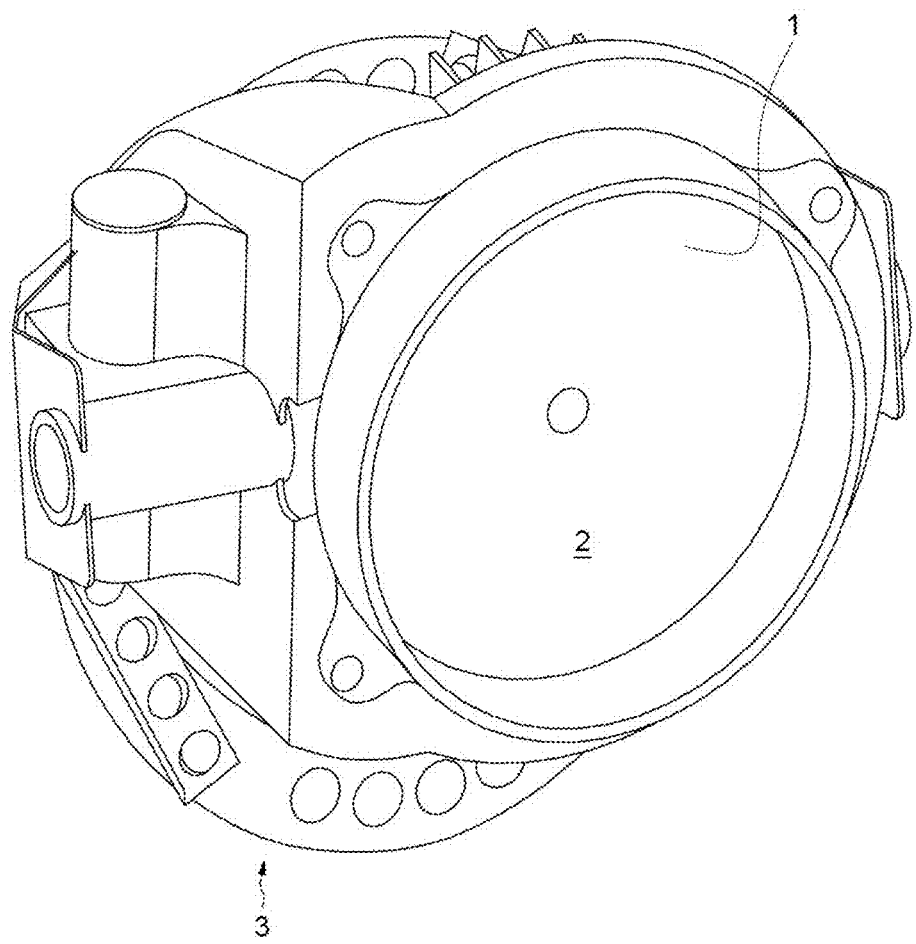
FIG. 5 is a general arrangement of an optical lighting system.
Figure 6A:
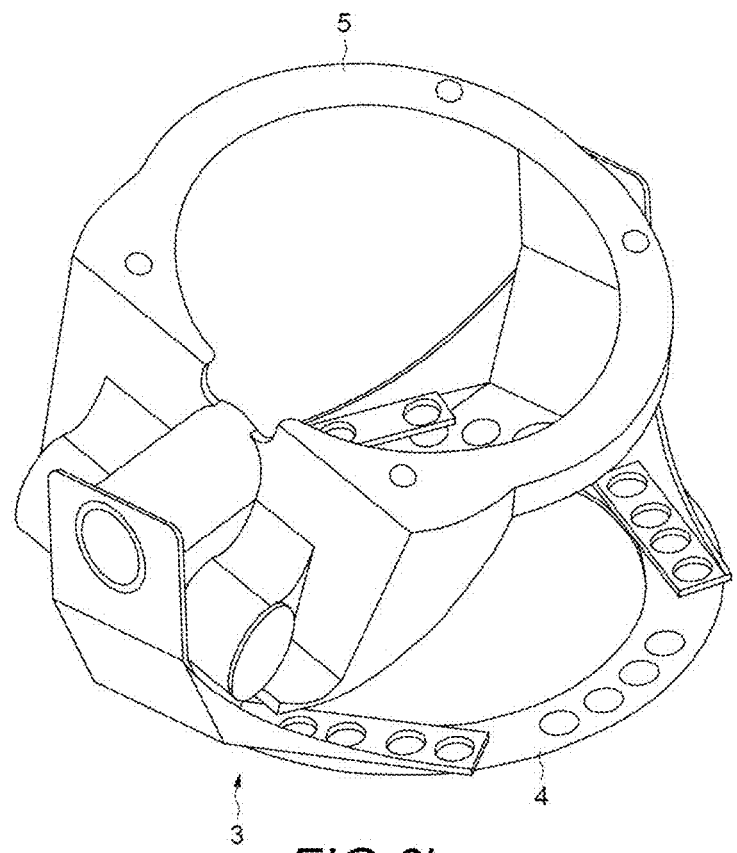
FIGS. 6A and 6B show details of the optical lighting system of FIG. 5.
Figure 6B:
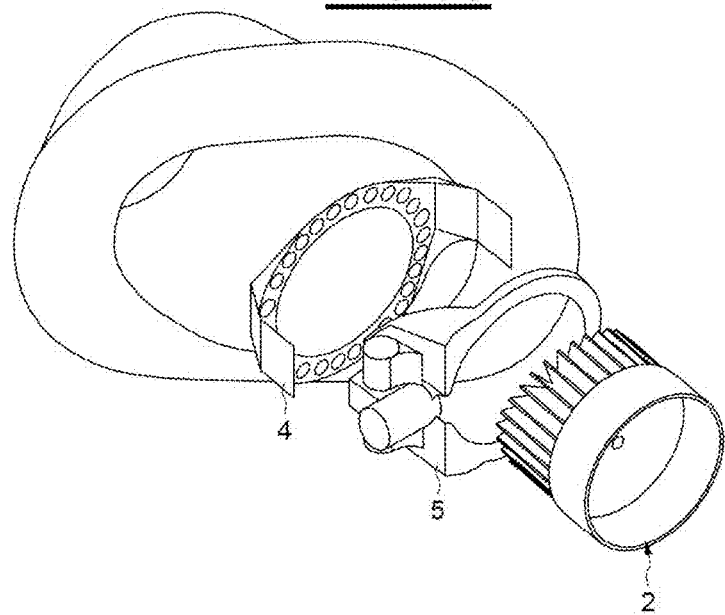

FIGS. 5, 6A and 6B depict an optical lighting system making it possible to emit a beam the characteristics of which correspond to the various phases of flight and of taxiing that have just been described. This in particular involves dynamically modifying the aim and spread of the beam as a function of the phases of flight and of taxiing.

As can be seen in these figures, the lighting system, denoted by the overall numerical reference 1, includes an optical unit 2 that includes a light source and an optical device and is mounted on a support 3 that includes a fixed part 4 and a mobile part 5 on which a configurable element of the optical unit is mounted. The overall assembly is mounted on a drum which is mounted at the root of the wing and is covered by a glazed surface which conforms to the fuselage of the airplane.

As will be detailed later on, the configuration of the beam of light emitted by the optical system can be modified either by action on the optical unit as a whole or by modifying the positioning of the light source or of an optical element of the lighting system, or even by modifying the configuration of the source.

However the modification of the angle of aim and of the spread of the beam of light is performed dynamically during the phase of flight or of taxiing.

To achieve this, the lighting system is further provided with a set of sensors incorporated within an inertial unit. As an alternative, the lighting system includes a detection device capable of detecting the taxiing of the aircraft using information of contact of the landing gear with the ground. In that case, the lighting system is further capable of receiving information conveyed on the onboard network digital bus indicating, for example, the moments at which the main landing gear and the nose gear are in contact with the ground or leave the ground. Of course, having the lighting system provided with sensors incorporated into an inertial unit and further receiving information carried on the on-board network digital bus does not constitute a departure from the scope of the invention.

Figure 7:
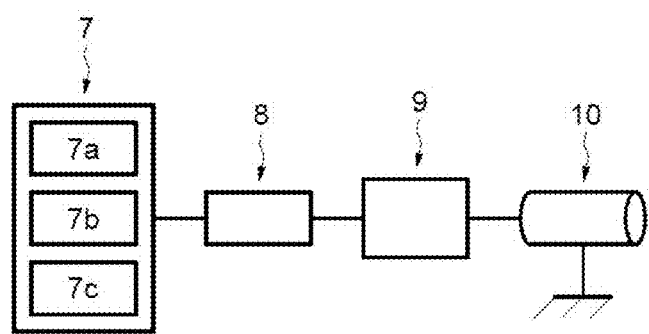
FIG. 7 is an overall block diagram of the device used for modifying the configuration of the beam of light of the lighting system of FIG. 5.

Thus, with reference to FIG. 7, which corresponds to an embodiment using sensors, the lighting system includes a detection device capable of detecting the phases of flight or of taxiing, which are referenced 7, and which, after filtering performed within a filtering stage 8, deliver information to a central control unit 9 that interprets the behaviour of the airplane, which unit governs the operation of a motor 10 acting on the mobile support.

The central unit incorporates all the hardware and software that allows it to act on the configuration of the beam of light. In particular, on the basis of the information delivered by the sensors, combined where appropriate as indicated hereinabove with information carried on the aircraft on-board network, for example regarding the position of the landing gear or indicating a "touched down" phase, the central unit 9 determines the phase of flight, for example by comparing against threshold values of inclination, acquires the values of the angle of aim and of spread of the beam of light and from that deduces what modification needs to be made to these angle of aim and angle of spread values according to the phases of flight or of taxiing. For example, after detecting the phase of flight or of taxiing, the angle and spread values are modified to set them to predetermined values stored in memory, each one corresponding to the phase detected.

Of course, controls that the pilot can manipulate may also be used to modify the configuration of the beam of light by hand on demand.

The detection device 7 first of all measure the inclination of the airplane with respect to the absolute horizontal.

This measurement is performed using an accelerometer 7a and a gyrometer 7b.

The accelerometer 7a provides an absolute angle of inclination of the airplane while the gyrometer 7b provides a measurement of the angular movement of the airplane during a determined period of time.

The accelerometer and the gyrometer are incorporated into an inertial unit that makes it possible always to know the absolute angular position of the airplane with respect to the horizontal.

Nevertheless, it will be noted that, in practice, the accelerometer and the gyrometer both have defects which adversely affect the angular measurements and, therefore, calculations.

Specifically, the accelerometer 7a is effective when the system on which it is dependent, namely of which it measures the variation in inclination, varies slowly, and when the calculation times are slow, namely when the sampling period is relatively long. As the principle of operation of an accelerometer is to use only the acceleration due to gravity in order to calculate an angle with respect to the absolute horizontal, it is necessary to eliminate parasitic external accelerations, such as vibrations or sudden variations in speed that the airplane experiences during the landing phase.

The gyrometer on the other hand is effective when the system on which it is dependent varies quickly and when the calculation times are short, namely when the sampling period is relatively short.

The major disadvantage of the gyrometer is that it is subjected to gyroscope drift. In other words, the gyroscope delivers a measurement which is corrupted by a systematic error which, multiplied by a time, gradually increases with angle estimates. It may also exhibit a systematic offset error, independent of time, which is simple to correct by applying the same offset to the measurement, but with opposite sign.

In the light of the foregoing, the measurements delivered by the accelerometer are generally disturbed by sudden accelerations and vibrations which, by nature, have a high frequency. The measurements from the gyrometer on the other hand are associated with gyroscope drift which falls within the range of low frequencies. Thus, each sensor delivers values that can be used either at high frequencies, in the case of the gyrometer, or at low frequencies, in the case of the accelerometer. The measurements supplied by the two sensors therefore complement one another.

Thus, the filtering performed by the filtering stage 8 involves applying to each measurement a filter which is made up of a high-pass filter and of a low-pass filter. It is also a matter of correcting the systematic offset error as indicated hereinabove.

The high-pass filter is applied to the measurements from the gyrometer, whereas the low-pass filter is applied to the measurements delivered by the accelerometer. It will be noted that, in order to avoid loss of information, the cut off frequency of the low-pass filter and the cut off frequency of the high-pass filter are the same for both filters.

In parallel, the detection device 7 takes a measurement of the inclination of the beam of light emitted by the optical lighting system. The detection device 7 is thus provided with a sensor 7c consisting either of an angular sensor or of a linear displacement sensor. These sensors use a potentiometer which constitutes a variable resistance, in the shape of an annulus in the case of an angular sensor. Such a sensor is advantageously positioned at the end of the mechanical sequence rotationally driven by the motor 10, as the beam pivots through only ten degrees or so.

Of course, the use of other types of sensors, for example optical sensors, would not constitute a departure from the scope of the invention. Such incremental sensors can be placed directly on the output of the motor because they make it possible directly to count the number of revolutions performed by the motor. The advantage of such a sensor is that it supplies at output a digital signal, thus avoiding the need to perform the sampling required when using a potentiometer.

As an alternative, Hall-effect sensors can also be used. Just like optical encoders, such sensors are advantageous insofar as they are contactless, thus avoiding inducing resistive torque.

A capacitive angular sensor, which is likewise contactless, may also be used. Such a sensor is generally made up of two sheets of capacitor positioned facing one another a small distance apart, and of an orientable tab that disturbs the electrical field created between the sheets as a function of the inclination measured.

Various embodiments of a controller configured to control the movement of the mobile support for configuring one or more configurable elements of the optical unit as a function of the phase of flight or of taxiing of the aircraft will now be described with reference to FIGS. 8-16.

As indicated hereinabove, the configurable element of the optical unit may either include the optical unit as a whole or of an internal element of the unit capable, when moved, of modifying the angle of aim and/or the spread of the beam.

Figure 8:
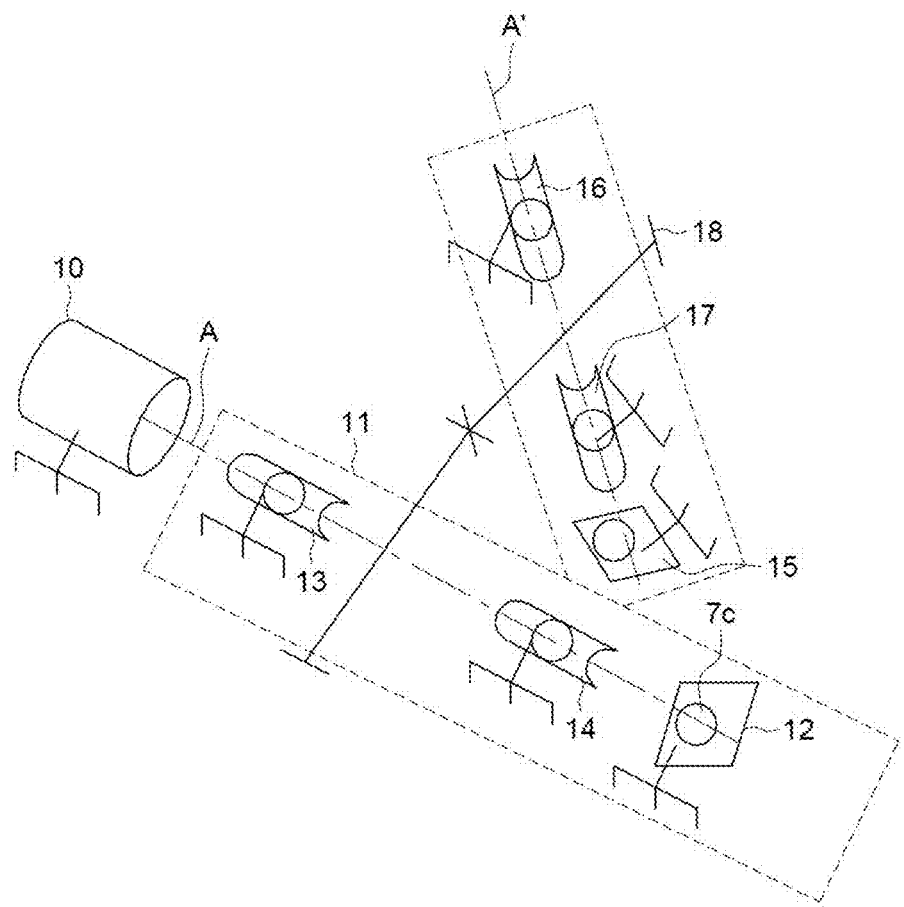

Referring first of all to FIG. 8, it may be seen that the motor 10 is, in this embodiment, connected to a coupling device 11 engaging with an axis A driven in rotation by the motor 10. The motor 10 includes for example of a reduction motor actuator. The axis A here rests on a stop 12 and is associated with an annular linear connection 13 providing rotational guidance for the axis A. In this embodiment, the sensor 7c that measures the inclination of the beam includes an angular sensor. This sensor 7c is therefore placed on the stop 12.

The axis A is also associated with a worm system 14.

The axis A' of rotation of the optical unit is itself resting against a fixed axial stop 15 and is associated with an annular linear connection 16 and with a pivot connection 17 engaged with a wheel 18 which collaborates with the worm 14 so that a rotation of the axis A of the coupling device 11 causes the wheel 18 to move and, as a result, orients the optical unit.

Figure 9:
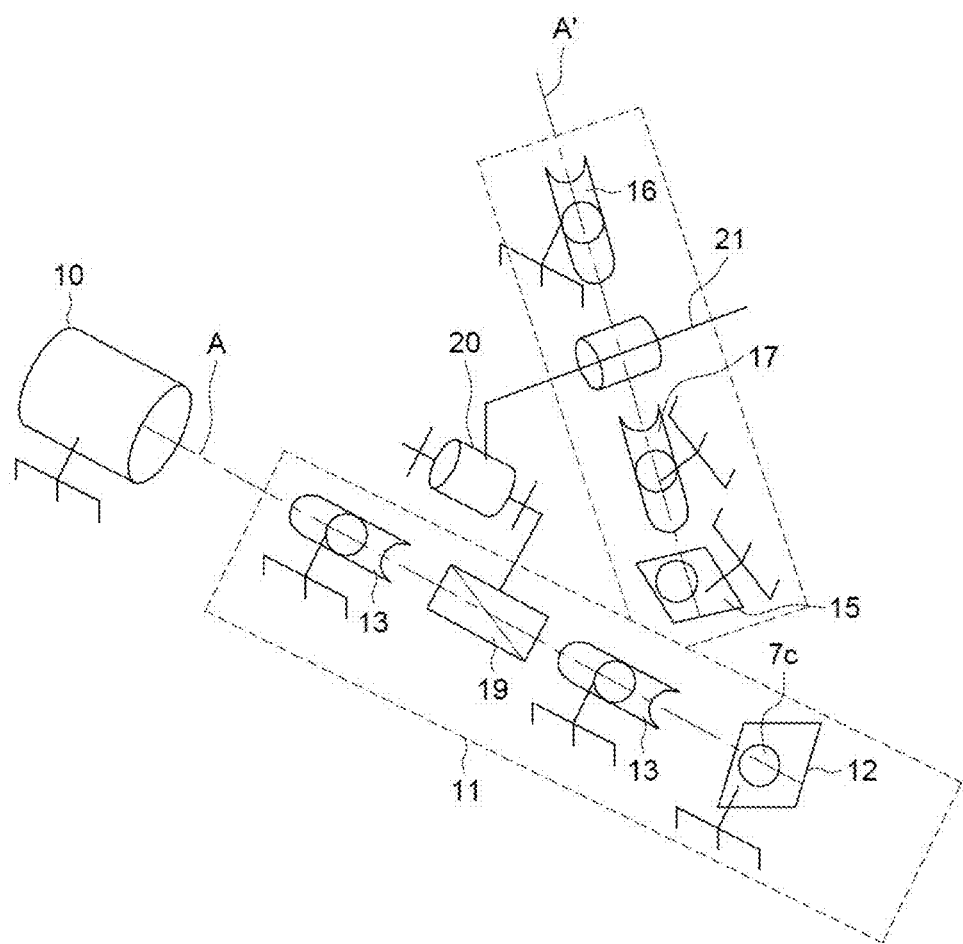

In the embodiment of FIG. 9, which shows the motor 10 rotating an axis A of the coupling device 11, itself associated with annular linear connections 13 and resting against the end stop 12 associated with the measurement sensor 7c, the coupling device 11 is provided with a screw/nut system 19 of which the nut is connected to a yoke 20 associated with a link rod 21 connected to the pivot connection 17 so that a rotation of the axis A likewise causes the axis A' of rotation of the optical unit to be oriented.

Thus, with reference to FIGS. 10 and 11, these embodiments make it possible to rotate the optical unit assembly as a function of the angles of inclination of the airplane and of the inclination of the beam.

Starting from an initial position (FIG. 10), it may be seen that a rotation of the optical unit assembly, here indicated schematically in the form of a source S placed in a reflector R and associated with an optical device D, causes a resultant modification of the angle of aim of the beam of light F.

With reference to FIG. 12, it is also possible, as an alternative, to offset the source S from the reflector R in order to bring about a resultant modification to the characteristics of the beam of light F.

With reference to FIG. 13, it is even possible to make the reflector R alone rotate in order to modify the angle of aim of the beam F.

Figure 14:
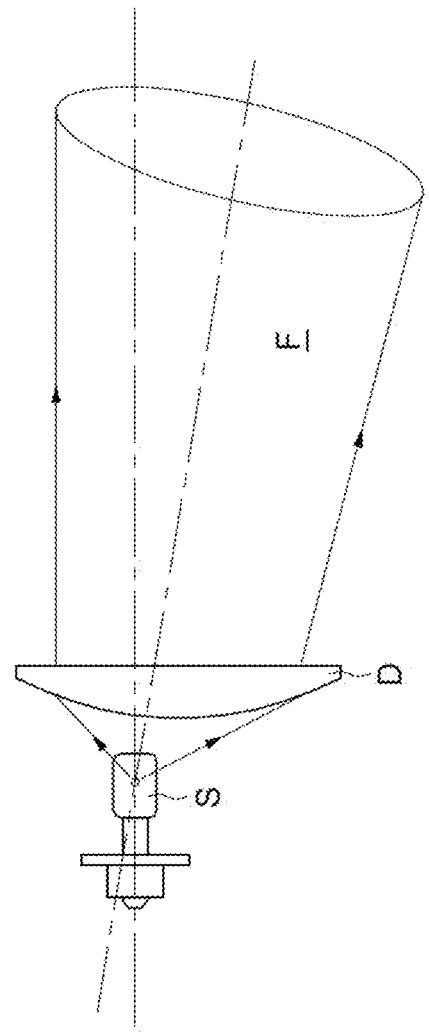

As visible in FIG. 14, it is even possible to bring about a translation movement of the outer lens G or window protecting the optical unit in order to adapt the beam of light to the phases of flight or of taxiing of the airplane.

Figure 15:
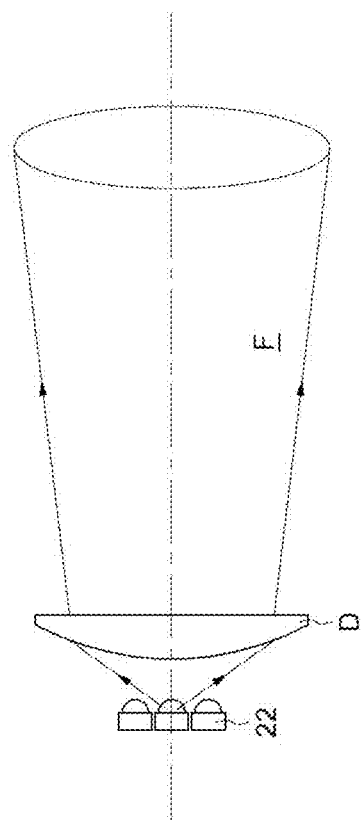
FIGS. 15 and 16 show another embodiment of an optical lighting system for an aircraft according to the invention, using configurable light-emitting diodes.
Figure 16:
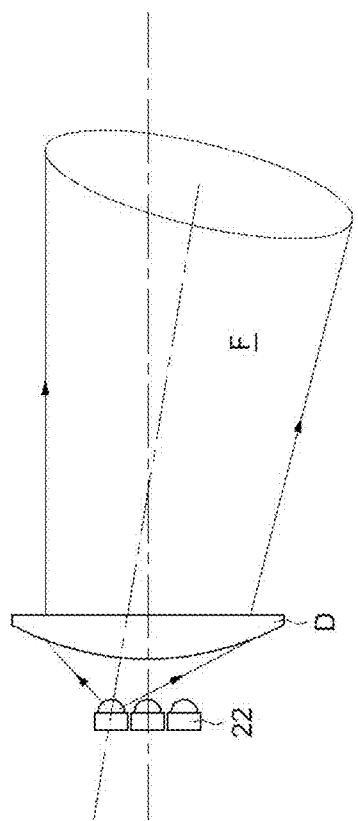

Finally, in the embodiment of FIGS. 15 and 16, the light source includes a set of light-emitting diodes such as 22.

In the configuration visible in FIG. 15, only the diode L situated along the optical axis of the optical device is activated. As can be seen in FIG. 16, by selectively lighting a light-emitting diode that is offset from the optical axis of the optical lighting system, a resultant modification can be made to the angle of aim of the beam of light F.

Of course, in the embodiment of FIGS. 15 and 16, the central unit which, in the embodiments described hereinabove has the task of causing the optical unit assembly or a configurable element of this optical unit to move, here governs the selective lighting of the light-emitting diodes according to the phases of flight or of taxiing detected.

The configurable element of the optical unit may advantageously include, as indicated hereinabove, of the reflector of the optical unit or of an optical device, such as an outer lens or protective window. It may even be the optical unit itself or the light source itself.

Finally, it will be noted that the invention is not restricted to the embodiments described hereinabove.

Specifically, in the embodiments described, the motor 10 includes a reduction motor actuator. It may alternatively include an electromagnet or of any other element capable of causing the optical unit or the configurable element thereof to move.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An optical lighting system for an aircraft, comprising:
   an optical unit that can be configured according to the phases of flight or taxiing of the aircraft and the angular variations of the aircraft's attitude angle in order to emit a beam of light (F) the spread and aim characteristics of which are dependent on the said phases of flight or of taxiing and the angular variations of the aircraft's attitude angle;
   a detection device capable of detecting the phases of flight or of taxiing of the aircraft by measuring the attitude of the aircraft, wherein the detection device comprises an accelerometer and a gyrometer, and wherein data measurements from the accelerometer and the gyrometer are used to determine an absolute angular position of the airplane with respect to horizontal; and
   a modification device capable of modifying the spread and aim characteristics of the beam of light emitted as a function of the phases detected and according to the angular variations of the aircraft's attitude angle with respect to horizontal;
   wherein a high-pass filter is applied to data obtained from the gyrometer and a low-pass filter is applied to data obtained from the accelerometer, and wherein filtered data measurements from the accelerometer and the gyrometer are used to determine an absolute angular position of the airplane with respect to horizontal; and
   wherein the cut off frequency of the low-pass filter is the same as the cut off frequency of the high-pass filter.

2. The system according to claim 1, wherein the detection device is capable of measuring the attitude of the aircraft.

3. The system according to claim 2, wherein the detection device comprises an inclination sensor capable of measuring the inclination of the beam of light with respect to an axis of the aircraft.

4. The system according to claim 1, wherein the detection device includes a sensor capable of determining contact of the aircraft landing gear with the ground.

5. The system according to claim 1, further comprising a fixed support for mounting the optical system on the aircraft and a mobile support that can be moved with respect to the fixed support and on which a configurable element of the optical unit is fixed, and a controller configured to control the movement of the mobile support as a function of the phases of flight or of taxiing of the aircraft.

6. The system according to claim 5, wherein the optical unit assembly is mounted on the mobile support so that it can be oriented according to the phases of flight or of taxiing.

7. The system according to claim 5, wherein the optical unit comprises a mobile reflector mounted on the mobile support.

8. The system according to claim 5, wherein the source (S) is mounted on the mobile support.

9. The system according to claim 5, further comprising an optical device placed in the path of the beam of light emitted by the light source, the said device constituting a light beam deflecting device and being mounted on the mobile support.

10. The system according to claim 5, wherein the light source comprises a set of electronic light-emitting diodes that can be actuated selectively according to the phases of flight or of taxiing.

11. The system according to claim 5, wherein the controller comprises a reduction motor actuator.

12. The system according to claim 5, wherein the controller comprises a bistable electromagnet.

* * * * *